Figure 1:
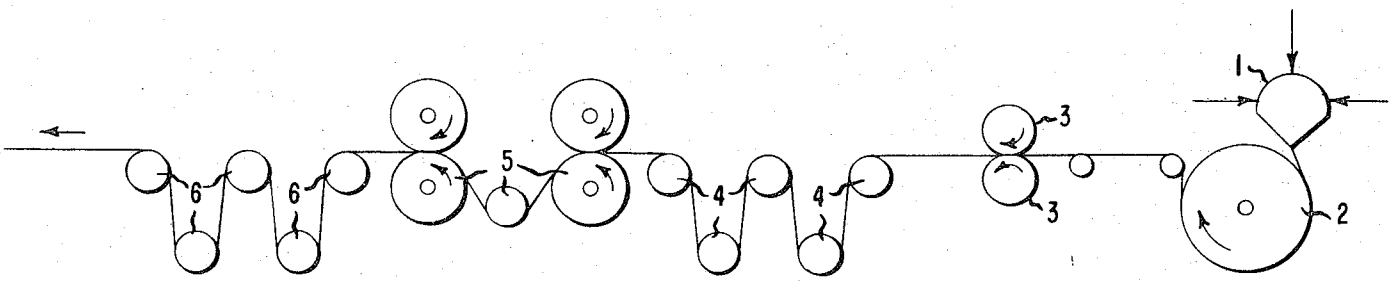
Figure 2:
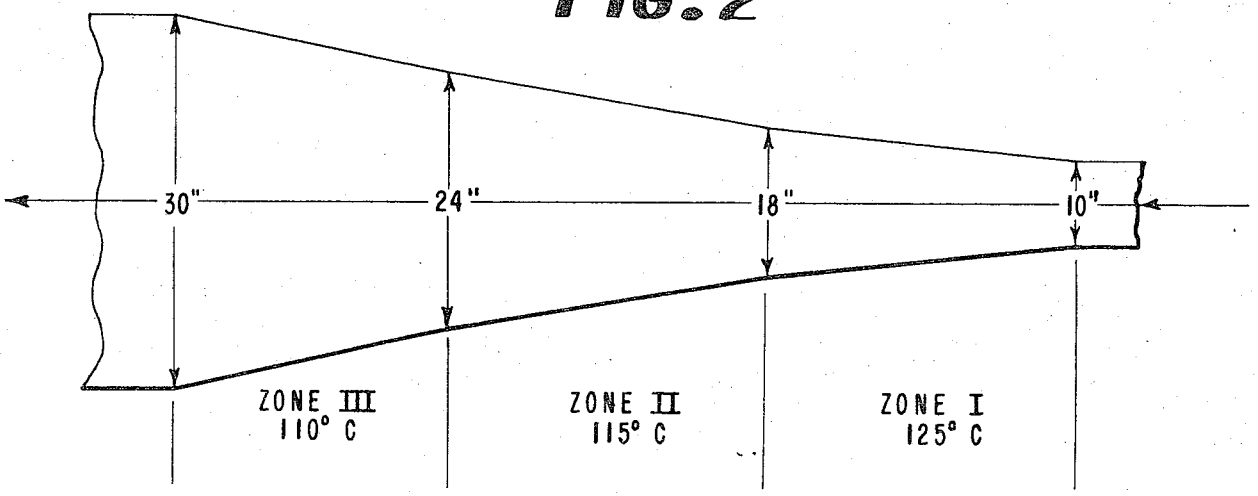

DEFENSIVE PUBLICATION

UNITED STATES PATENT OFFICE

Published at the request of the applicant or owner in accordance with the Notice of Dec. 16. 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 10

T883,009

PROCESS FOR THE MANUFACTURE OF THIN GAGE POLYSTYRENE FILMS

Max Goldman, 23 Batavia Drive, Williamsville, N.Y. 14221

Continuation of abandoned application Ser. No. 735,456, June 7, 1968. This application Mar. 23, 1970, Ser. No. 20,450

Int. Cl. B29f *3/10;* C08f *7/02;* D01d *5/12*

U.S. Cl. 264—166

1 Sheet Drawing. 11 Pages Specification

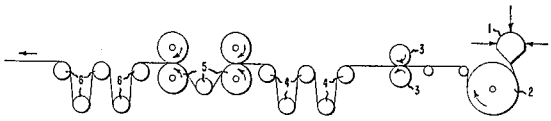

A process for the production of polystyrene film having a thickness of less than 1 mil by coextruding at least one polystyrene film and thermoplastic supporting film having a melt strength of at least 0.02 k.p.s.i. at 100° C. and which is non-orientable above about 100° C.; quenching the resulting structure; molecularly orienting the polystyrene at a temperature of about from 100° to 125° C. and separating the films of the structure. Preferred support films include branched polyethylenes.

Feb. 2, 1971 M. GOLDMAN T883,009

PROCESS FOR THE MANUFACTURE OF THIN GAGE POLYSTYRENE FILMS

Original Filed June 7, 1968

INVENTOR
MAX GOLDMAN

BY Donald W. Hanley

ATTORNEY